United States Patent
Hong et al.

(10) Patent No.: US 7,636,115 B2
(45) Date of Patent: Dec. 22, 2009

(54) HIGH DYNAMIC RANGE IMAGING DEVICE USING MULTIPLE PIXEL CELLS

(75) Inventors: Chris Sungkwon Hong, Boise, ID (US); Jeffrey A. McKee, Meridian, ID (US)

(73) Assignee: Aptina Imaging Corporation, Grand Cayman (KY)

(*) Notice: Subject to any disclaimer, the term of this patent is extended or adjusted under 35 U.S.C. 154(b) by 679 days.

(21) Appl. No.: 11/201,332

(22) Filed: Aug. 11, 2005

(65) Prior Publication Data
US 2007/0035653 A1    Feb. 15, 2007

(51) Int. Cl.
*H04N 5/335* (2006.01)

(52) U.S. Cl. ............ 348/294; 348/315; 348/275; 348/276; 348/272; 348/273; 257/232

(58) Field of Classification Search ........... 348/294, 348/315, 275, 276, 272, 273; 257/232
See application file for complete search history.

(56) References Cited

U.S. PATENT DOCUMENTS

| | | | | |
|---|---|---|---|---|
| 4,602,289 A | * | 7/1986 | Sekine | 348/315 |
| 5,889,277 A | * | 3/1999 | Hawkins et al. | 250/208.1 |
| 6,211,915 B1 | * | 4/2001 | Harada | 348/298 |
| 6,522,425 B2 | * | 2/2003 | Yoshidome | 358/1.9 |
| 6,831,692 B1 | * | 12/2004 | Oda | 348/315 |
| 7,092,019 B1 | * | 8/2006 | Ogata et al. | 348/263 |
| 2003/0103150 A1 | * | 6/2003 | Catrysse et al. | 348/272 |
| 2005/0001143 A1 | * | 1/2005 | Rhodes | 250/208.1 |
| 2005/0151218 A1 | * | 7/2005 | Mouli | 257/446 |
| 2007/0024879 A1 | * | 2/2007 | Hamilton et al. | 358/1.9 |
| 2007/0024931 A1 | * | 2/2007 | Compton et al. | 358/512 |

* cited by examiner

*Primary Examiner*—David L Ometz
*Assistant Examiner*—Quang V Le
(74) *Attorney, Agent, or Firm*—Dickstein Shapiro LLP

(57) ABSTRACT

A method and apparatus for achieving high-dynamic range operation with a set of spatially distributed pixel cells is provided. A pixel array with a row of pixels having apertures of varying sizes in a metal mask formed thereon controls the sensitivity of each pixel cell to light. A neutral density filter having varying light transparency values is also provided over the set of pixel cells to control the sensitivity of each pixel cell to light. The pixel cells voltage outputted is combined to obtain high-dynamic range operation.

17 Claims, 13 Drawing Sheets

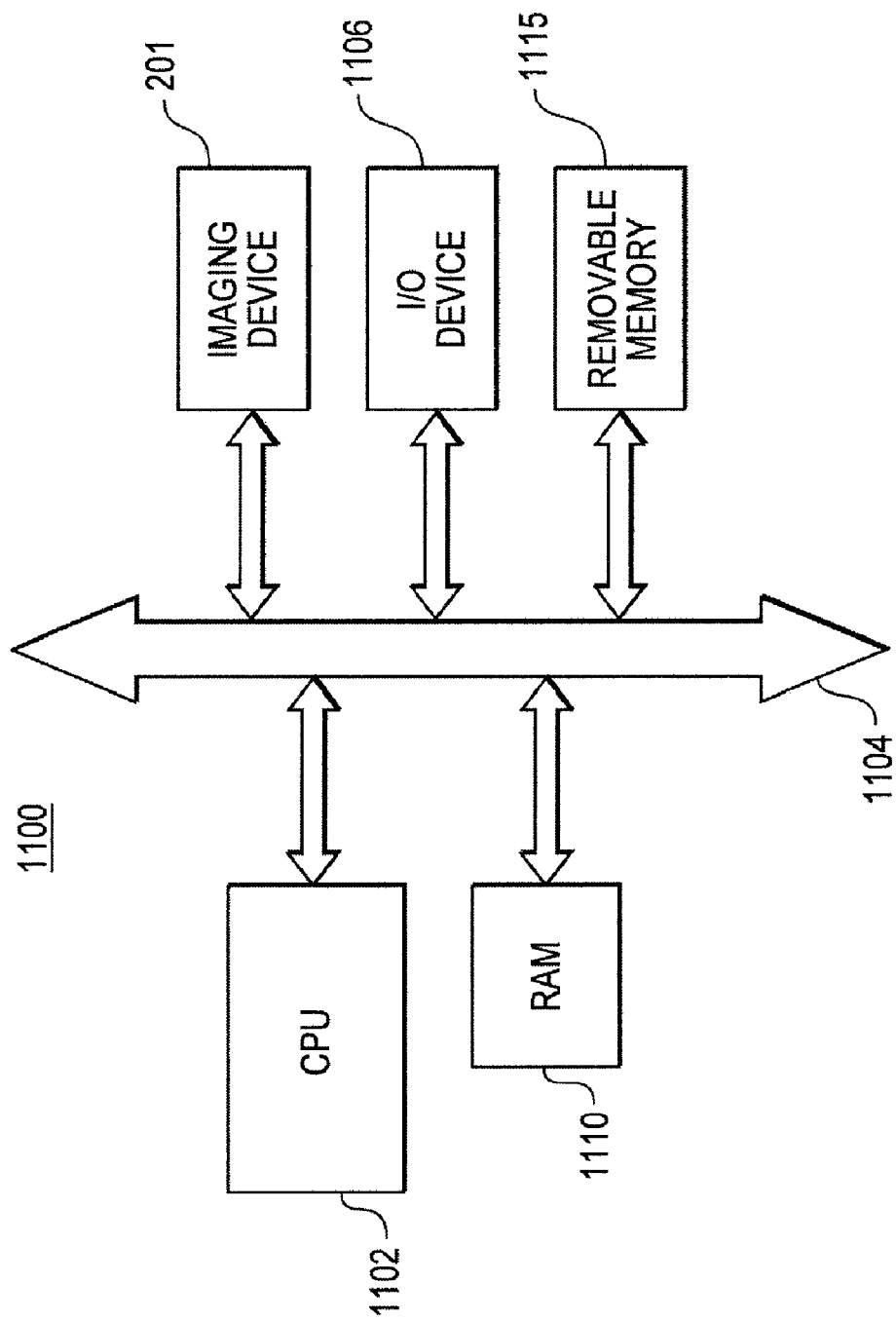

ized image by an image sensor is too small
HIGH DYNAMIC RANGE IMAGING DEVICE USING MULTIPLE PIXEL CELLS

FIELD OF THE INVENTION

The present invention relates generally to a structure and method of obtaining a high-dynamic range image by using a set of spatially distributed pixel cells that have varying degrees of sensitivity to light incident on the individual pixel cells, and a method of making the same.

BACKGROUND OF THE INVENTION

Imaging devices typically employ a sensor to detect light, and in response, generate an electrical signal representative of the light incident on the sensor. The sensor typically employs a light sensing element such as a photodiode, and associated circuitry for selectively reading out the electric signal provided by the light sensing element. For example, light photons impinge upon the photodiode and are converted into electrons that constitute the electrical signal. Currently there are several known types of solid-state imaging devices. The two primary types of imaging devices are CCD (charge coupled device) devices and CMOS devices.

A typical four transistor (4T) CMOS imager pixel cell 10 is shown in FIG. 1. The pixel cell 10 includes a photosensor 12 (e.g., photodiode, photogate, etc.), transfer transistor 14, floating diffusion region FD, reset transistor 16, source follower transistor 18 and row select transistor 20. The photosensor 12 is connected to the floating diffusion region FD by the transfer transistor 14 when the transfer transistor 14 is activated by a transfer gate control signal TX.

The reset transistor 16 is connected between the floating diffusion region FD and an array pixel supply voltage Vaa_pix. A reset control signal RST is used to activate the reset transistor 16, which resets the floating diffusion region FD to the array pixel supply voltage Vaa_pix level as is known in the art.

The source follower transistor 18 has its gate connected to the floating diffusion region FD and is connected between the array pixel supply voltage Vaa_pix and the row select transistor 20. The source follower transistor 18 converts the charge stored at the floating diffusion region FD into an electrical output voltage signal Vout. The row select transistor 20 is controllable by a row select signal SEL for selectively connecting the source follower transistor 18 and its output voltage signal Vout to a column line 22 of a pixel array.

One common problem associated with solid-state imaging devices, including CCD and CMOS imaging devices, is consistency in a pixel cell's responsivity to light incident on the light sensing element across an array of pixel cells. For example, the responsivity of a first pixel cell will be different from a second pixel cell's responsivity. Consequently, the signal to noise (S/N) ratio of the pixel cells will not be equal which affects the overall dynamic range of the pixel cell array.

Image sensor arrays have a characteristic light dynamic range. Light dynamic range refers to the range of incident light that can be accommodated by an image sensor in a single frame of pixel data. It is desirable to have an image sensor with a high light dynamic range to image scenes that generate high light dynamic range incident signals, such as indoor rooms with windows to the outside, outdoor scenes with mixed shadows and bright sunshine, night-time scenes combining artificial lighting and shadows, and many others.

The electrical dynamic range for an image sensor is commonly defined as the ratio of its largest non-saturating signal to the standard deviation of the noise under dark conditions. Dynamic range is limited on an upper end by the charge saturation level of the image sensor, and on a lower end, by noise imposed limitations and/or quantization limits of the analog to digital converter used to produce the digital image. When the light dynamic range of an image sensor is too small to accommodate the variations in light intensities of the imaged scene, e.g., by having a low light saturation level, the full range of the image scene is not reproduced.

As pixel cell size is scaled down, so is the size of the photo-conversion device. Therefore, the amount of charge the photo-conversion device and pixel cell can accumulate is reduced, degrading the image sensor's dynamic range. There are several approaches to improve dynamic range, one of which utilizes dual integration periods. As indicated above, another approach would be to add transistors to the pixel cell. Since it may be difficult to implement additional transistors inside a pixel while at the same time maintaining a small pixel size, the dual integration period approach is more desirable because the pixel cell can remain the same and only pulse timing related modifications would be needed.

It is desirable for an imager device to be capable of imaging in the presence of a high level of dynamic range in the brightness of the light incident upon pixel cells. It is also desirable for the imaging to be performed as a linear function of incident light. However, for any given integration period, in the presence of incident light having a high level of brightness, there is a danger of overexposure due to the photosensor 12 producing too many photo-generated charges. Conversely, in the presence of incident light having a low level of brightness, there is a danger of underexposure due to the photosensor 12 producing too few photo-generated charges.

Pixel cells having photosensors with the greatest sensitivity will become saturated first. Once a pixel cell saturates, the exposure to light is stopped to avoid blooming and other saturation artifacts. Conventional pixel arrays determine light intensity by illuminating the detector in the active area and determining light intensity simultaneous with image acquisition. As mentioned above, blooming or saturation is a problem that occurs when too many photons strike a particular pixel cell and overflow into adjacent pixel cells, which causes the adjacent pixel cells to incorrectly sense the image. When light intensity is determined in the active area pixel cells, there is a greater probability of blooming or saturation occurring on individual pixel cells because the detection of light intensity is occurring simultaneously as the active area pixel cells are receiving light.

What is needed, therefore, is an image sensor which achieves an improved dynamic range, and can be implemented using conventional pixel cells. An optimal pixel cell has a high dynamic range and low fixed pattern noise.

SUMMARY

Exemplary embodiments of the invention provide a set of spatially distributed pixel cells having different light response sensitivities to provide a high dynamic range with low fixed pattern noise. At least one pixel cell of the spatially distributed set of pixel cells has high sensitivity to light so that it becomes easily saturated and yields good resolution for dark signals. At least one other pixel cell of the set has a lower sensitivity to light such that it is slowly saturated with a bright signal. The sensitivity of the at least two pixel cells of the set is controlled by the sizes of apertures in a light-blocking layer, and a light transparent neutral density filter layer to control the light sensitivity of the at least two pixel cells of the set. Each of the apertures have different individual neutral density filter layers providing different light sensitivities to each respective pixel cell of the set. A method of forming a pixel array containing the light blocking layer and neutral density filter layer is also provided.

A method of achieving high dynamic range operation with the set of spatially distributed pixel cells is provided by combining signal outputs from each individual pixel cell of a set, or by choosing one pixel cell of a set as representing the pixel output.

Additional advantages and features of the present invention will be apparent from the following detailed description and drawings which illustrate preferred embodiments of the invention.

BRIEF DESCRIPTION OF THE DRAWINGS

FIG. 1 is an electrical schematic of a 4T pixel cell in which the present invention can be employed with.

FIG. 13 shows a processor system incorporating at least one imaging device constructed in accordance with an embodiment of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

Additionally, processing steps described and their progression are exemplary of preferred embodiments of the invention; however, the sequence of steps is not limited to that set forth herein and may be changed as is known in the art, with the exception of steps necessarily occurring in a certain order.

The term "substrate" is to be understood as including silicon, silicon-on-insulator (SOI) or silicon-on-sapphire (SOS) technology, doped and undoped semiconductors, epitaxial layers of silicon supported by a base semiconductor foundation, and other semiconductor structures. Further, when reference is made to a "substrate" in the following description, previous process steps may have been utilized to form regions, junctions or material layers in or on the base semiconductor structure or foundation. In addition, the semiconductor need not be silicon-based, but could be based on other semiconductors such as silicon-germanium, germanium, or gallium arsenide, as non-limiting examples.

The term "pixel" refers to a photo-element unit cell containing a photoconversion device for converting electromagnetic radiation to an electrical signal and transistors which operate the pixel cell. For purposes of illustration, a representative pixel cell is illustrated in the figures and description herein, and typically fabrication of all pixel cells in an imaging device will proceed simultaneously in a similar fashion.

Although the invention is described herein with reference to the architecture and fabrication of a set of four pixel cells that are repeated to form a pixel array, it should be understood that this is merely representative. It should also be appreciated that the present invention can be applied with as little as a set of two pixel cells forming the spatially distributed pixel cell network.

In addition, although the invention is described below with reference to a CMOS imaging device, the invention has applicability to other solid-state imaging devices having pixel cells, including but not limited to CCD imaging devices. The following detailed description is, therefore, not to be taken in a limiting sense, and the scope of the invention is defined only by the appended claims.

Figure 1:
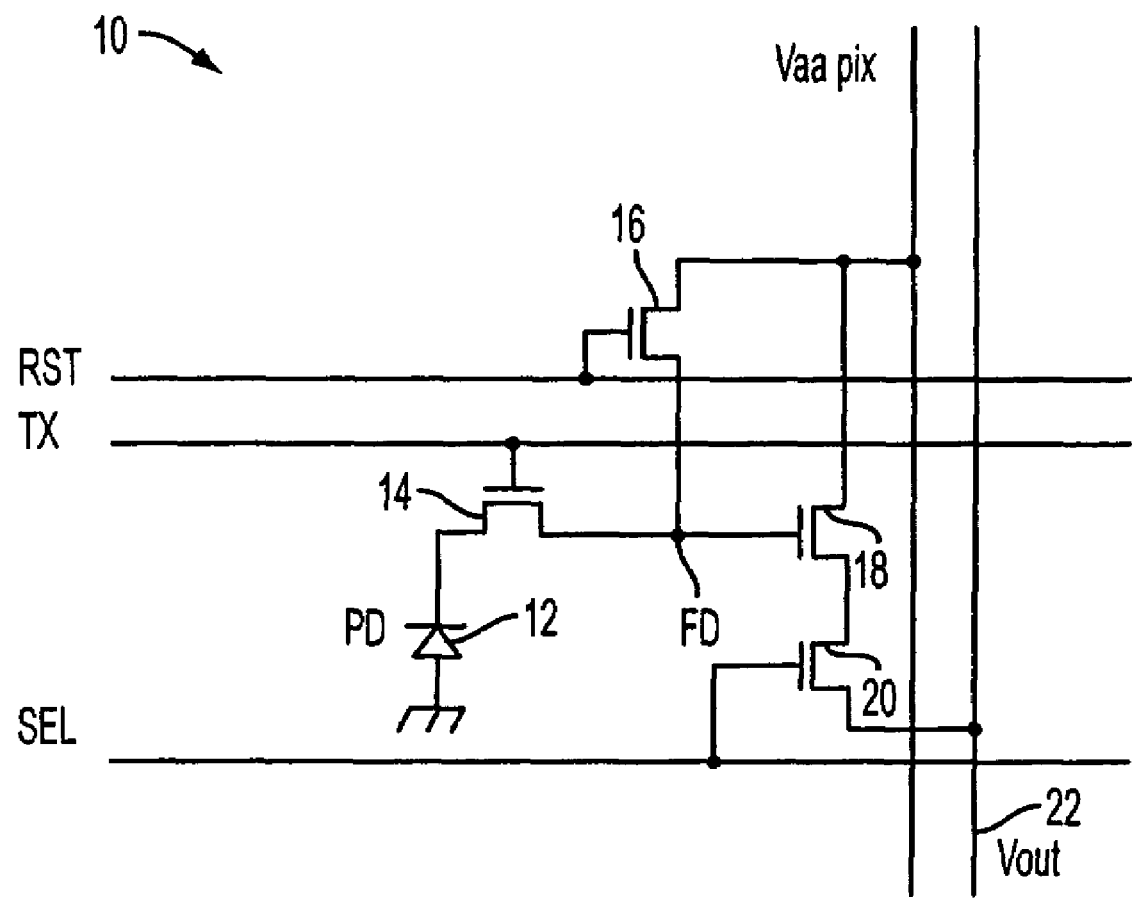
Figure 2:
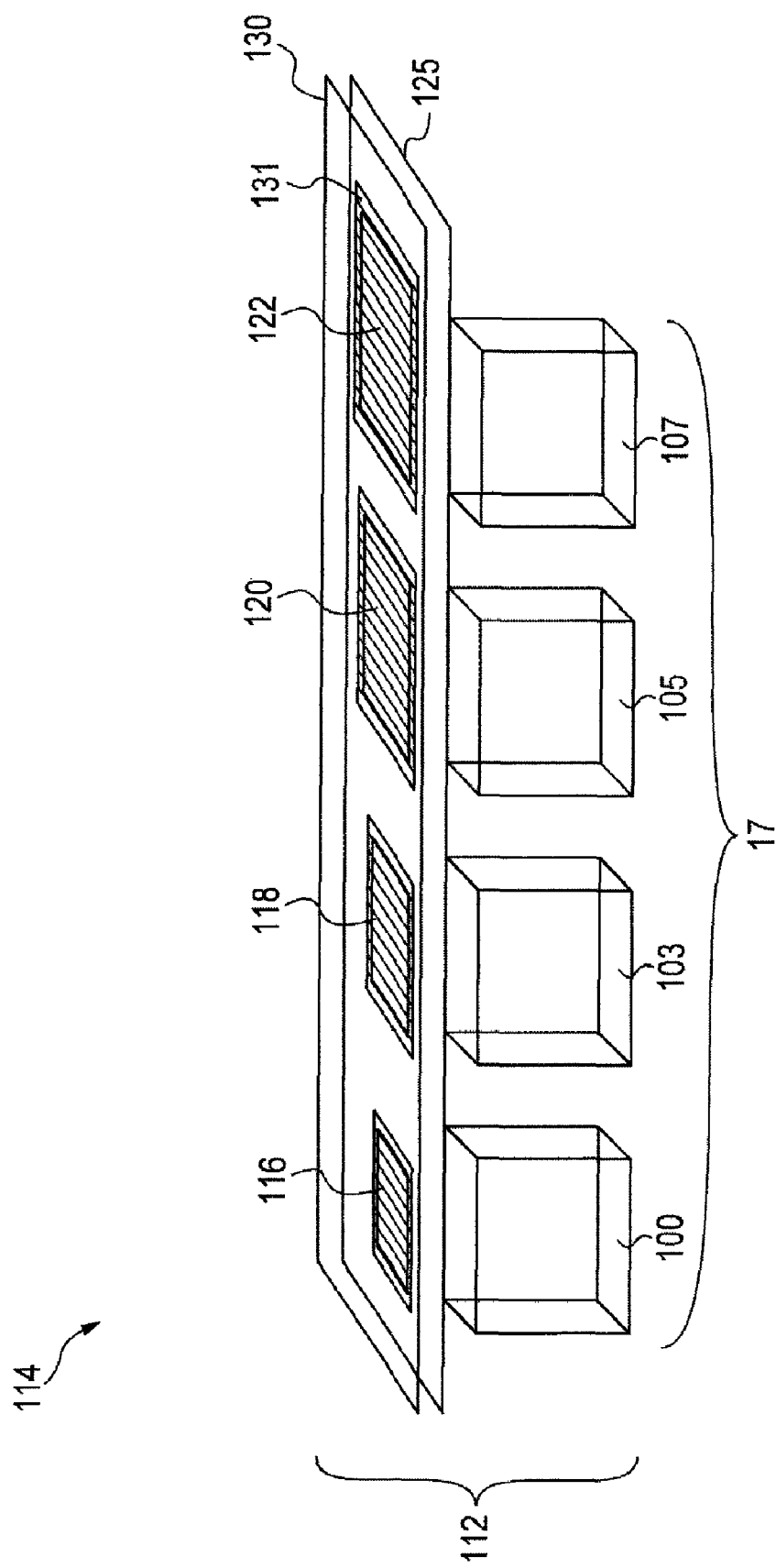
FIG. 2 is a schematic cross-sectional view of pixel cells with a mask having varying aperture sizes and a neutral density filter layer with varying transparencies.

Referring now to the drawings, where like elements are designated by like reference numerals, FIG. 2 illustrates an exemplary set of four spatially distributed pixel cells 100, 103, 105, and 107 of a pixel array 114 constructed in accordance with one embodiment of the present invention. The pixel cells are arrayed with other like pixel cells in a set 112 of cells with the sets repeating in a pixel array 114. It should be appreciated, that one pixel cell, i.e., pixel cell 100, of a set 112, can be formed with a photosensor, e.g., a photodiode, whereas, other pixel cells, i.e., pixel cell 103, of a set 112, can be formed with a different size photosensor. Accordingly, the pixel cells used to form a pixel array 114, can be formed to have varying sized photosensor regions. This in turn, affects each pixel cell's sensitivity to light.

Still referring to FIG. 2, an exemplary pixel array 114 with a portion of a set of pixels 112 is illustrated. An opaque mask 125 with varying-sized apertures 116, 118, 120, 122 is placed over the set of pixel cells 112 to control the light responsivity of each pixel cell, i.e., pixel cells 100, 103, 105, and 107. It should be appreciated that any number of varying sized apertures can be placed over any number of pixel cells. For exemplary purposes, only a set 112 of four pixel cells, i.e., 100, 103, 105, and 107 are illustrated in FIG. 2. The present invention can be employed with a set as small as two pixel cells.

The mask 125 can be made of an opaque material and for exemplary purposes is made of metal, although other opaque materials may be used. In one embodiment, the pixel cell sizes of the pixel array 114 can be approximately the same size as each other. In another embodiment, the pixel cell sizes are different from each other in the pixel array 114. Moreover, each pixel cell can have the same or different size photosensors, thereby affecting each pixel cell's responsivity and sensitivity to light. As FIG. 2 illustrates, the set of pixel cells 112 comprises pixel cell 100, pixel cell 103, pixel cell 105, and pixel cell 107.

Varied aperture sizes can be used as a method of controlling the light sensitivity of each pixel cell of the row of pixel cells 112. In FIG. 2, aperture 116 is comparatively smaller than aperture 118 located adjacent to it, and in turn aperture 120 is comparatively smaller than aperture 122 next to it. It should be appreciated that each aperture formed over the individual pixel cells of the set of pixel cells 112, can be formed to have varying sizes and shapes.

For example, the apertures can be formed to have substantially the same size as the photosensor for their respective pixel cells. As indicated above, each photosensor for each pixel cell can have the same or different size than a neighboring pixel cell. In another exemplary embodiment, the aperture can be formed to have substantially the same shape as the other apertures. Again, each photosensor for each pixel cell can have the same or different size than a neighboring pixel cell.

In other words, the aperture sizes are used to determine at what light intensity the pixel cells 100, 103, 105, and 107 will become saturated. When light intensity reaches a certain point, pixel cell 103 with aperture 118 will not be saturated, while pixel cell 105 with aperture 120 located directly adjacent to aperture 118 and being slightly larger than aperture 118, will be saturated. The comparison of the non-saturated pixel cell vs. the saturated pixel cell based on the size of the aperture allows a program, in an imager processor, to determine where to set the integration time for the entire pixel array based on the saturation points of the individual pixel cells with varying sized apertures.

Still referring to FIG. 2, the mask 125 is used in conjunction with a light transparent neutral density filter layer 130. The neutral density filter 130 and mask 125 are used together to maximize the ratio of light sensitivity from brightest to darkest pixel cell. For example, the largest aperture 122 can be formed with a high transparency film 131. The smallest aperture 116 can be formed with the darkest transparency film. Typically, the neutral density filter layer 130 is formed on top of mask 125.

Accordingly, each aperture opening of pixel array 114 can be formed with a different transparency neutral density filter layer 130. Alternatively, each aperture opening of pixel array 114 can be formed with the same transparency neutral density filter to control the overall light transmitted to the set of pixel cells 112. Still further, only one aperture opening of pixel array 14 may be provided with a neutral density filter layer 130, or two aperture openings, etc.

A pixel cell with a large light opening aperture 122, such as pixel cell 107, will have maximum sensitivity, while pixel cell 100, will have low light sensitivity because the incident light intensity is so weak. For example, the neutral density filter layer 130 is provided over aperture 122 to allow maximum light transmittability. Pixel cell 100 has a small light opening aperture 116 and can be formed with a neutral density filter layer 130 that reduces light transmittability, such that the light transmittability can vary between pixel cells of a pixel array 114.

Figure 3:
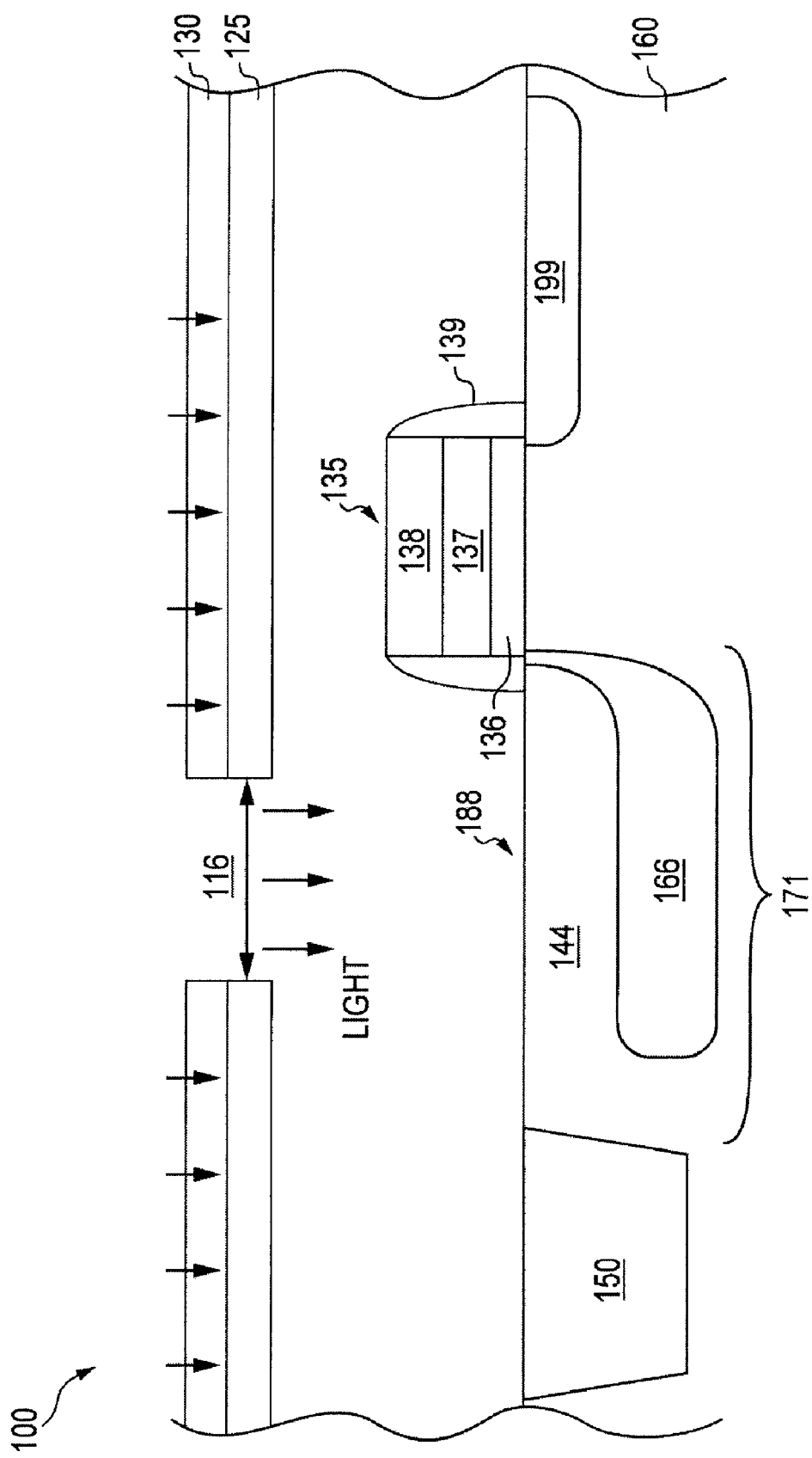
FIG. 3 is a cross-sectional and schematic view of a 4T pixel cell employing a mask having an aperture and neutral density filter layer.

A close-up of pixel cell 100 is provided in FIG. 3. In FIG. 3, mask 125 is formed having aperture 116. Aperture 116 can be formed to have any size or shape desired, depending on the desired light sensitivity of pixel cell 100. As FIG. 3 illustrates, a neutral density filter layer 130 is formed over mask 125 to further control the amount of light incident upon photodiode 188.

In one exemplary embodiment, the size of photodiode 188 can vary from pixel cell, i.e., pixel cell 100, to pixel cell, i.e., pixel cell 103, in pixel array 114 affecting the amount of photogenerated charge received from light incident on the photodiode. For example, pixel cell 100 can be formed with a large photodiode 188 to allow more charge to be stored and accumulated by pixel cell 100. In a neighboring pixel cell of pixel array 114, such as pixel cell 103 (FIG. 2), pixel cell 103 can be formed with a larger, smaller, or same size photodiode as pixel cell 100. Consequently, each pixel cell of pixel array 114 can have different sized photodiodes.

As a result, mask 125 and the neutral density filter layer 130 can be formed, if desired, to have the same size and shape of photodiode 188. Alternatively, the mask 125 and the neutral density filter layer 130 can be formed, if desired, to have a different size and shape as photodiode 188. The combination of mask 125 and neutral density filter layer 130, affects pixel cell 100's ability to focus light incident on photodiode 188. For example, if mask 125 is formed with a smaller aperture than pixel cell 100's photodiode 188, the amount of light incident on pixel cell 100's photodiode 188 is reduced than a neighboring pixel cell having a larger aperture.

In some instances, mask 125 can be formed to have a larger aperture 116 than illustrated, or a smaller aperture 116. In other instances, the neutral density filter layer 130 will have high transparency, low transparency, medium transparency, or no transparency at all. It should be appreciated that each pixel cell of pixel array 114 (FIG. 2) can be formed in a similar manner with varying responsivity to light as illustrated by pixel cell 100 of FIG. 3.

The neutral density filter layer 130 can also be used as a color filter array. In other words, a gray or black color filter array material can be placed over each respective pixel cell of pixel array 114 (FIG. 2) to obtain different quantum efficiency characteristics. It should also be appreciated that although FIG. 2 illustrates the neutral density filter layer 130 on mask 125, the mask 125 can be formed on top of the neutral density filter layer 130, or, intervening layers can be present between mask 125 and neutral density filter layer 130.

FIG. 3 also illustrates a multi-layered transfer transistor gate stack 135 formed over a semiconductor substrate 110. The transfer transistor gate stack 135 comprises a first gate oxide layer 136, a conductive layer 137, and a second insulating layer 138. If desired, a silicide layer (not shown) may be also formed in the multi-layered gate stack 135 between the conductive layer 137 and the second insulating layer 138. Sidewall spacers 139 are formed on the sides of the transfer transistor gate stack 135.

FIG. 3 further illustrates shallow trench isolation regions 150 and p-well regions 194. A p-n-p photodiode structure 188 formed by regions 144, 160 and 166. The p-type doped region 110 is shown to be the substrate which is p-type doped. The implanted n-doped region 166 forms a photosensitive charge collection region 171 for collecting photogenerated electrons. The p-type pinned surface layer 144 is formed over the implanted n-type region 166 and between the transfer gate 135.

A n-type floating diffusion region 199 is located laterally adjacent to the multi-layered gate stack 135 and opposite the n-type doped region 166 of the p-n-p photodiode 188. The multi-layered transfer gate stack 135 transfers charge accumulated in the charge collection region 171 of the photodiode 188 to the floating diffusion region 199.

Additional processing steps may be used to form insulating, photo-device shielding (as indicated and further described below), and interconnect metallization layers as desired. For example, an inter-layer dielectric (ILD) may be formed over and between the transistors of the pixel cell 100 in order to provide adequate insulation between conductive metallization layers formed above the adjacent pixel cells. In order to maintain a high level of quantum efficiency of the pixel cell 100 of the invention, the metallization may be routed around the photosensors or transparent metallization layers may be used, so that light is not blocked from the photosensors. Conventional layers of conductors and insulators (not shown) may also be used to interconnect the structures and to connect the pixel cell 100 to peripheral circuitry.

Exemplary CMOS imaging circuits, processing steps thereof, and detailed descriptions of the functions of various CMOS elements of an imaging circuit are described, for example, in U.S. Pat. No. 6,140,630 to Rhodes, U.S. Pat. No. 6,376,868 to Rhodes, U.S. Pat. No. 6,310,366 to Rhodes et al., U.S. Pat. No. 6,326,652 to Rhodes, U.S. Pat. No. 6,204,524 to Rhodes, and U.S. Pat. No. 6,333,205 to Rhodes. The disclosures of each of the forgoing are hereby incorporated by reference herein in their entirety.

Figure 4:
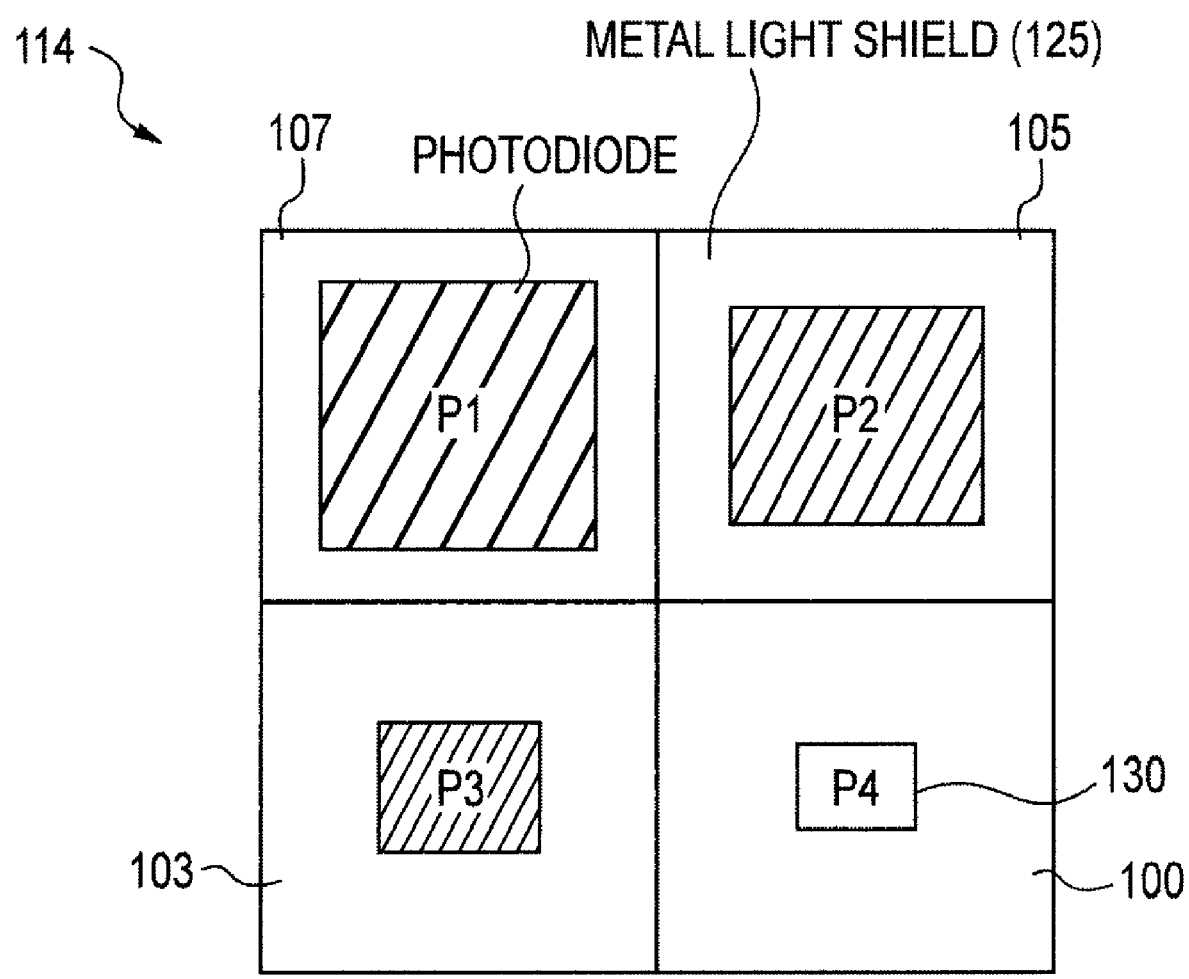
FIG. 4 is a top-down view of a pixel array having pixel cells, such as illustrated in FIGS. 2-3, having various size apertures in a mask and a neutral density filter layer.

Referring now to FIG. 4, a top-down view of a portion of the pixel array 114 is illustrated. Again, a set of for pixel cells 100, 103, 105, and 107 are shown. Each pixel cell has a different sized light opening with mask 125 and, varying light sensitivities through the neutral density filter layer 130. Accordingly, each pixel cell receives a different amount of photon sensitivity on the associated photodiode (P1, P2, P3, or P4). Thus, it is simple to adjust the quantum efficiency of each pixel cell by changing the size of the aperture over each photodiode, and the light-blocking characteristics of neutral density filter layer 130. It should be noted that for a color pixel array, a color filter array, formed typically of green, red, and blue filters is still employed. These are typically formed at a level of the imager array above the level containing the neutral density filter layer 130.

Figure 5:
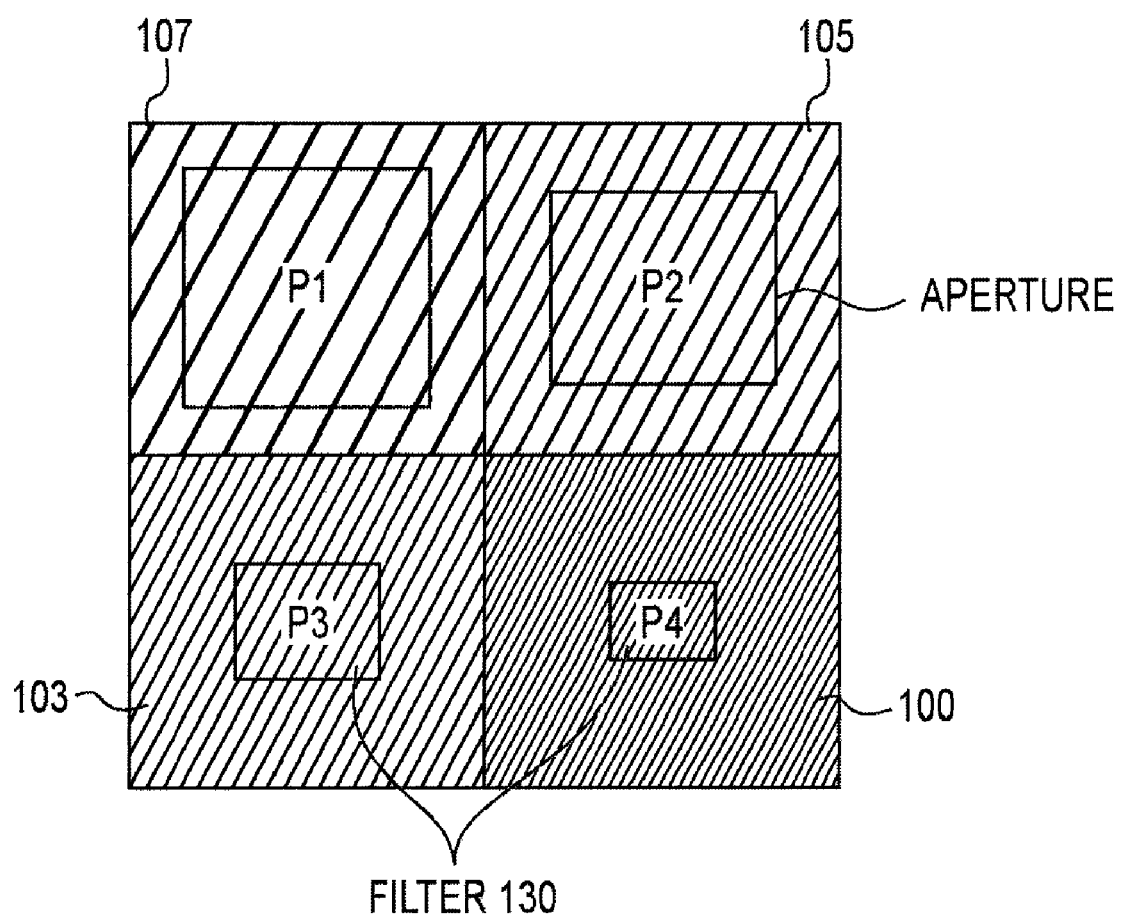
FIG. 5 is another top-down view of a pixel array having pixel cells, such as illustrated in FIGS. 2-3, having various size apertures in a mask and a neutral density filter layer in accordance with another embodiment of the invention.

Referring now to FIG. 5, another top-down view of a portion of a pixel array 114 is illustrated. Again, a set of four pixel cells 100, 103, 105, and 107 are shown. In this embodiment, a neutral density filter layer 130 is used mask 125. In FIG. 5, the quantum efficiency for each pixel cell is controlled by the transparency of filter material. Pixel cells 105 and 107 have high transparency film coverings, whereas, pixel cells 103 and 100 have low transparency film coverings. Each pixel cell of a set can have a different neutral density filter 130, if desired, or one or more pixel cells of a set may have no neutral density filter 130. In FIG. 5, pixel cell 107 has the highest quantum efficiency and sensitivity since it has the largest aperture with the most transparent neutral density filter layer 130. Pixel cell 100 has the lowest quantum efficiency and sensitivity since it has the smallest aperture with the least transparent neutral density filter layer 130. Pixel cells 103 and 105 have medium quantum efficiencies and sensitivities, respectively.

Figure 6:
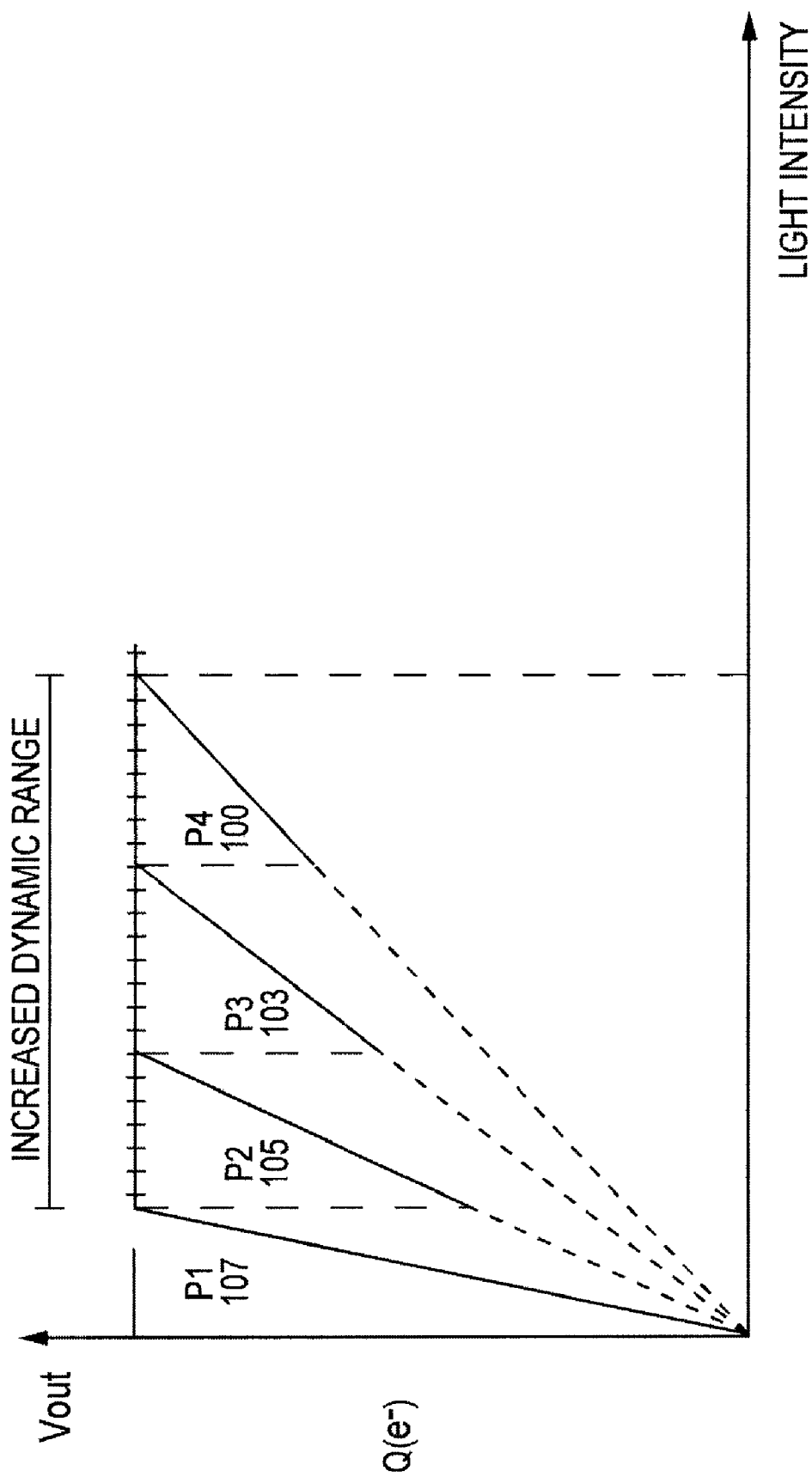
FIG. 6 is a graph illustrating the output signal (or photo-generated electrons) vs. light intensity before saturation.

Referring now to FIG. 6, FIG. 6 illustrates the expected output characteristics for each pixel cell of FIGS. 4-5, before saturation. Pixel cell 107 will be saturated first with a high slope. Pixel cell 105 will then become saturated, and pixel cell 103, and then pixel cell 100 becoming saturated last. Pixel cell 100 will reach saturation level at a very bright light intensity as compared to pixel cells 107, 105, and 103. In this manner, the present invention allows for pixel cell 107 to be used to detect low light scenes, and pixel cell 100 can be used to detect bright light scenes. Pixel cell 100 has very low responsivity whereas pixel cell 107 has very high responsivity. As a result, high-dynamic range operation can be achieved with a 4T pixel cell. In FIG. 6, the increased dynamic range is indicated from P1 saturation point to P4 saturation point. In addition, the knee points of the final output signal is aligned to the position of each saturation point. Consequently, the first knee point is located at the light level where P1 saturation occurs. Similarly, the second knee point and P2 saturation is aligned to each other, and so on and so forth.

Figure 7:
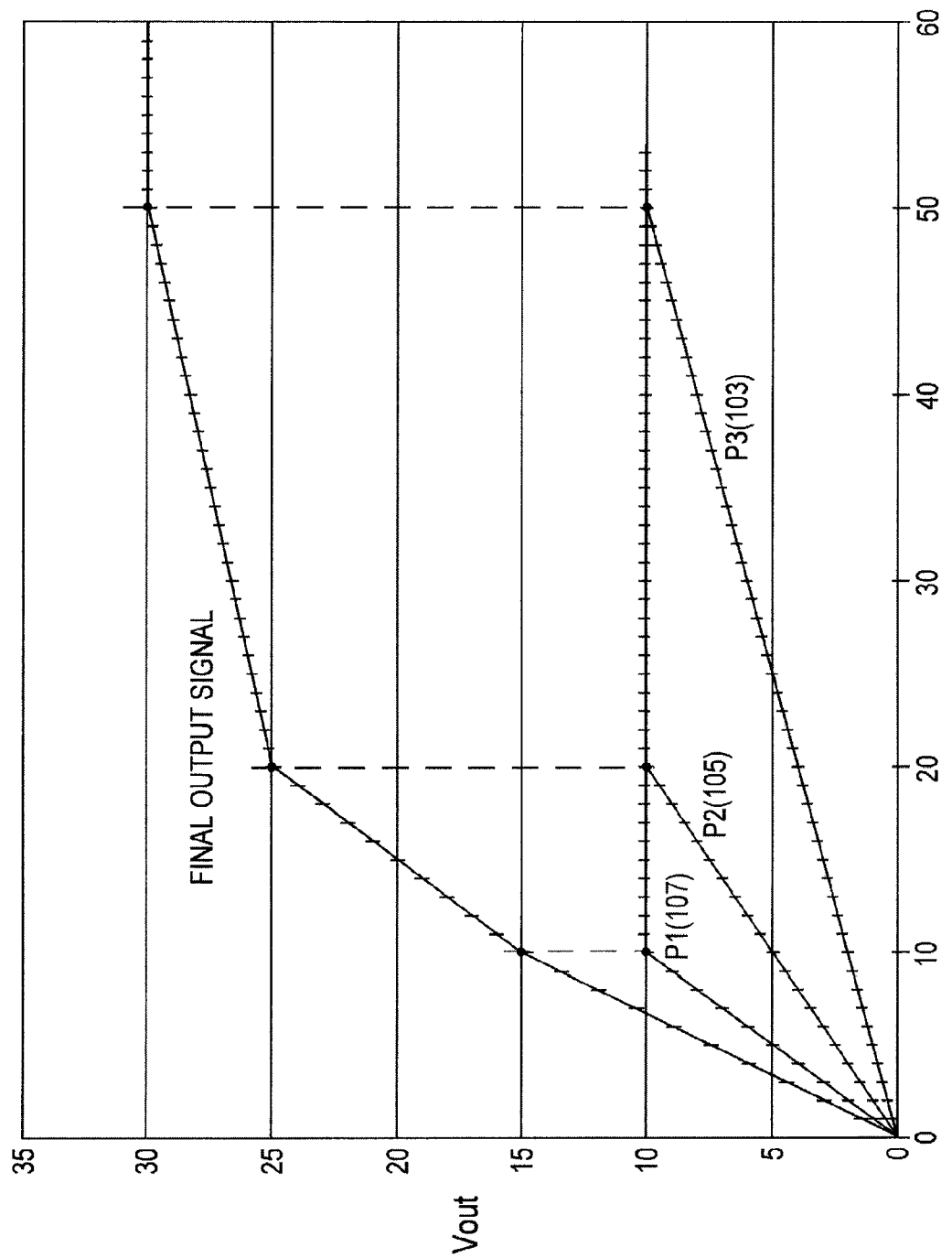
FIG. 7 is a graph illustrating the voltage outputted by each individual pixel cell constructed in accordance with the invention vs. light intensity that is combined with the same saturation level.

After collecting all four signal outputs from the individual pixel cells 107, 105, 103, and 100, the signal outputs can be combined, for example, together to obtain a final output characteristic for the pixel set, thus achieving the desirable high-dynamic operation characteristics as illustrated in FIG. 7. In FIG. 7, in order to obtain high-dynamic operation characteristics, the Voutput of each pixel cell is combined (pixel cell 107+pixel cell 105+pixel cell 103+pixel cell 100). In this exemplary embodiment, the pixel cells output are combined when having equal saturation levels, i.e., the pixel cells are formed to have substantially the same saturation levels. This is not the case in FIG. 8.

Figure 8:
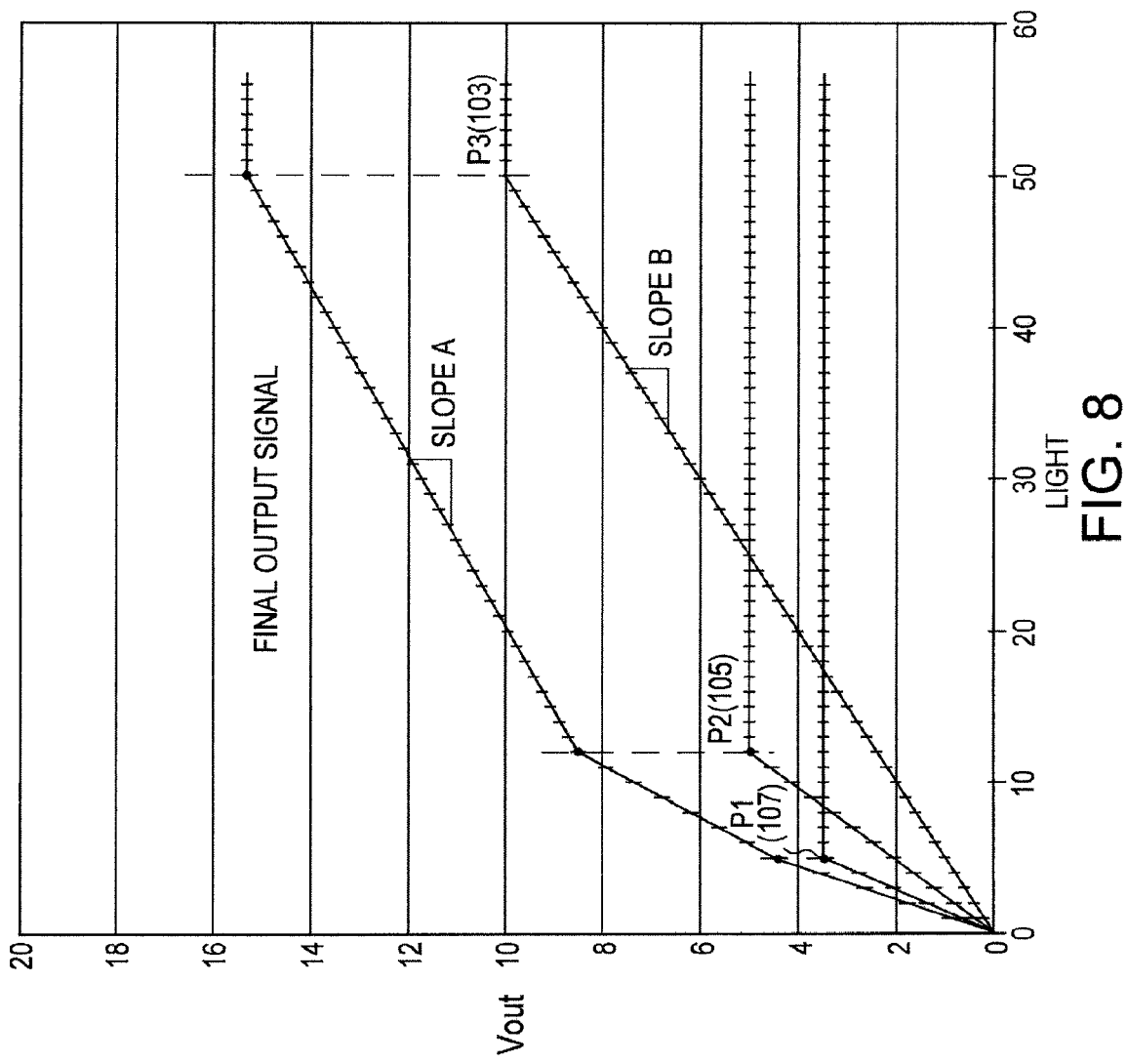
FIG. 8 is a graph illustrating the voltage outputted by each individual pixel cell constructed in accordance with the invention vs. light intensity that is combined having varying saturation levels.

In FIG. 8, if each pixel cell of pixel array 114 (FIG. 3), has different saturation levels due to varying size apertures in mask 125 and varying transparencies of neutral density filter layer 130, the "knee" point of each pixel cell can be located. The term "knee" reflects the fact that the "knee" creates an angle in the illumination-voltage profile, such that the maximum saturation voltage is reached at a greater level of illumination. The different saturation levels of each individual pixel cell creates a "knee" in the illumination-voltage profile of the imaging device, thereby increasing the light dynamic range of the pixel cell. FIG. 8 illustrates an illumination v. output voltage graph in accordance with the present invention.

Figure 9:
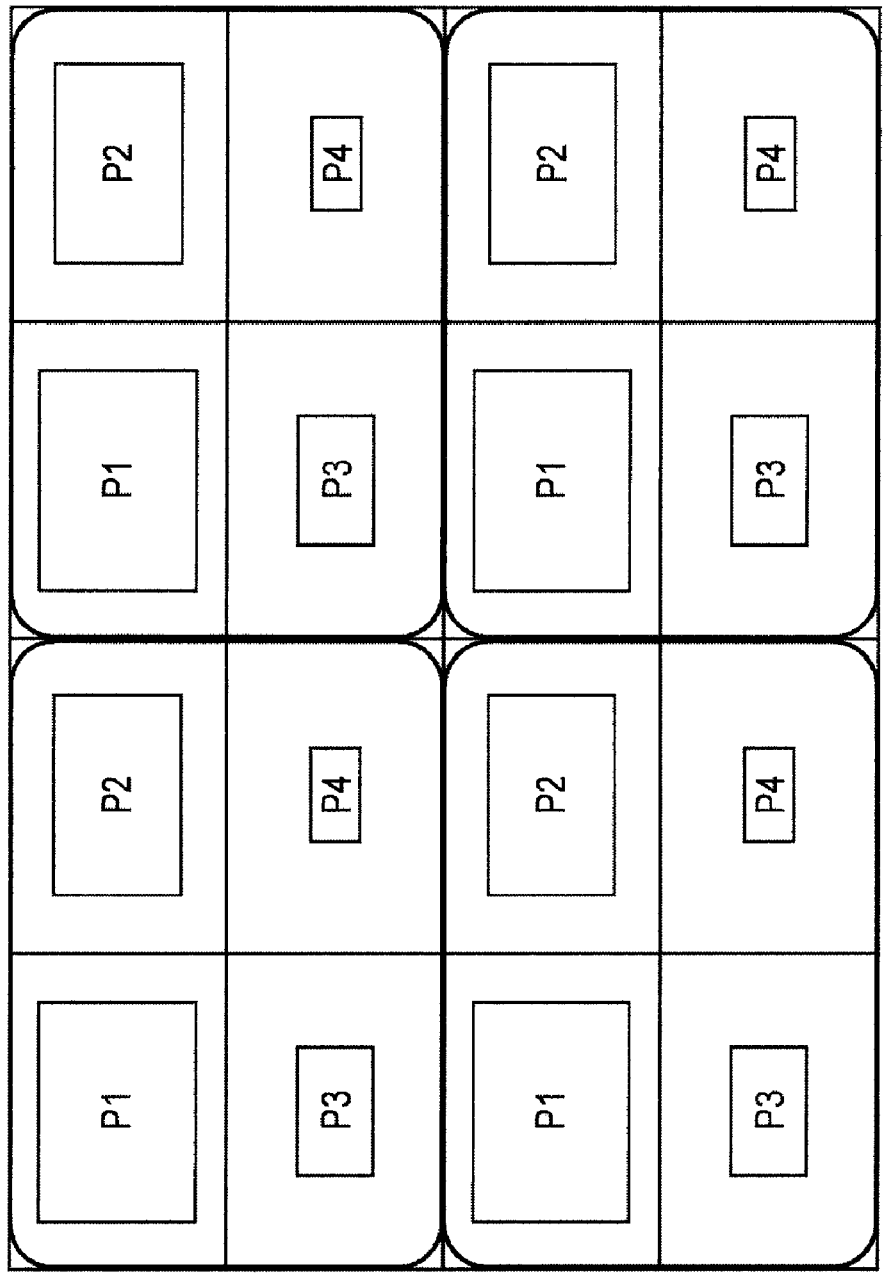
FIG. 9 is a top-down view of a plurality of pixel arrays read-out in one fashion.

The present invention may also be used with varying aperture sizes of mask 125 and neutral density filter layer 130 in order to customize the pixel array 114 according to a particular user's needs. For example, an imager pixel array 114 can be arranged whereby every N pixel cells are covered with the same or different aperture sizes of mask 125, and every N pixel cells are covered with mask 125 and neutral density filter layer 130. For example, in FIG. 9, the pixel array has N number of pixel cells times the M number of masks. The image is formed by the N number of pixel cells divided by 2 times the M number of masks divided by 2. In FIG. 9, image resolution is lost by times ¼ of pixel cell resolution.

Figure 10:
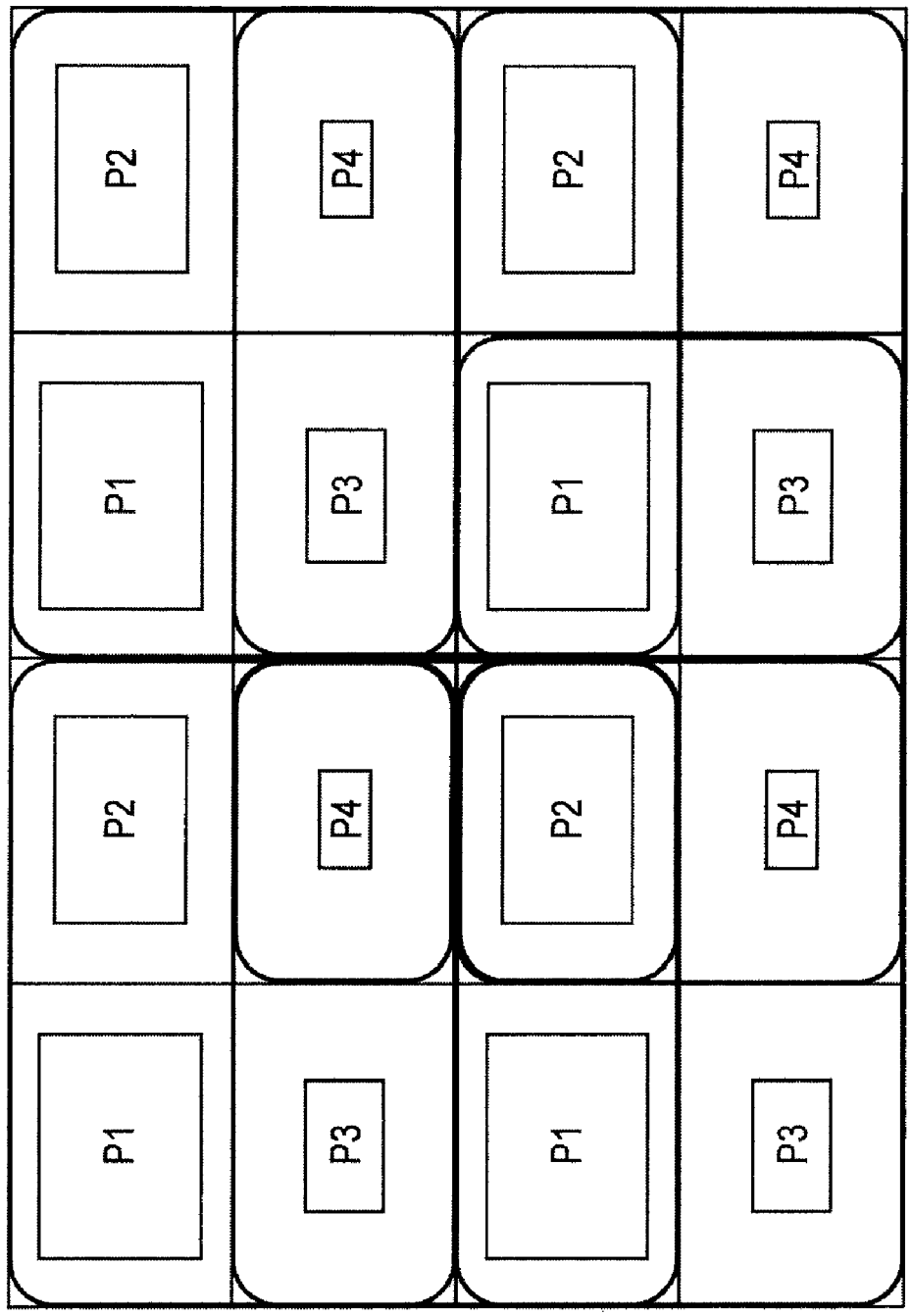
FIG. 10 is a top-down view of a plurality of pixel arrays read-out in accordance with an embodiment of the invention.

In FIG. 10, the pixel array has N number of pixel cells times the M number of masks. The image is formed by the N number of pixel cells minus one times the M number of masks minus one. In FIG. 10, final image resolution on high illumination is the same as the pixel cell resolution. However, in low light conditions, the image resolution is reduced by times ¼ factor. Consequently, P1 should be greater than P2, P3, and P4. Whereas, P2 should equal P3. In this manner, one can keep the same resolution whether on low light or on high light.

Figure 11:
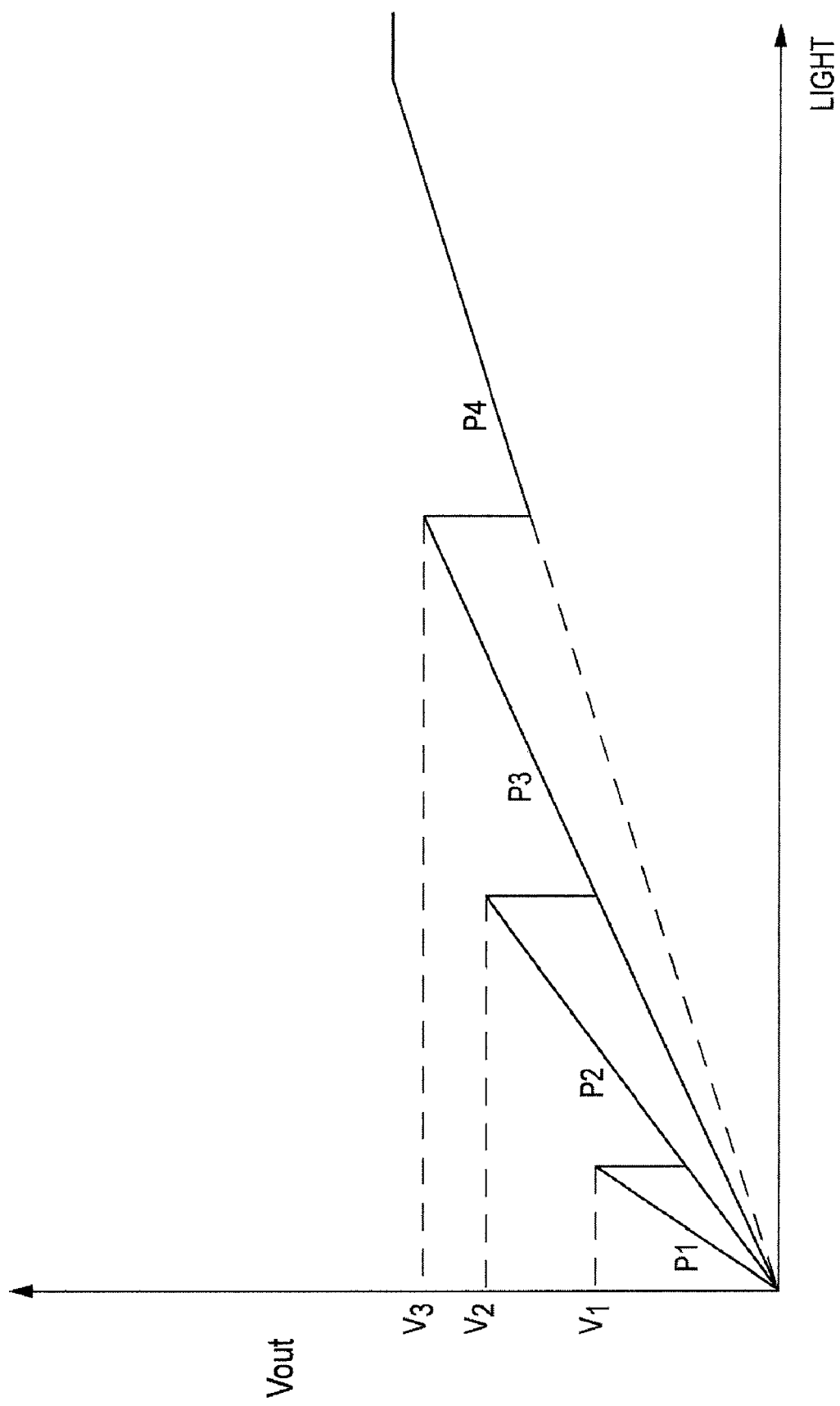
FIG. 11 is a graph of the voltage outputted from each individual pixel cell of a pixel array vs. light intensity in which each pixel cell is selectively chosen depending upon the voltage outputted.

For example, FIG. 11 illustrates one embodiment of obtaining high-dynamic characteristics. In FIG. 11, if Voutput, P1 is less than or equal to V1, then P1 (pixel cell 107) is selected. If Voutput, P1 is greater than V1 and Voutput, P2 is less than or equal to V2, then select P2 (pixel cell 105). If Voutput, P2 is greater than V2 and Voutput, P3 is less than or equal to V3, then select P3 (pixel cell 103). If Voutput, P3 is greater than V3 then select P4 (pixel cell 100).

Figure 12:
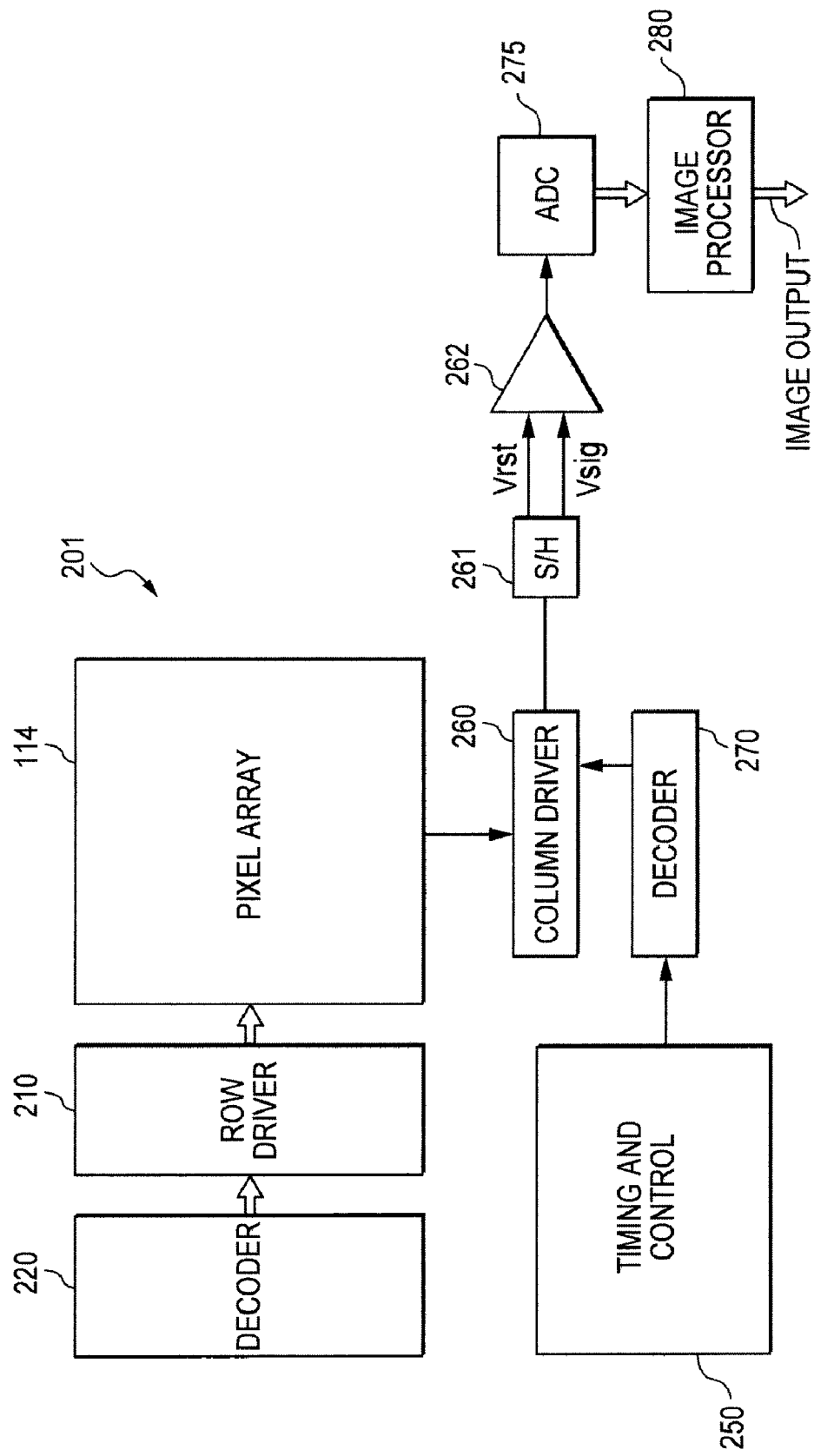
FIG. 12 is a block diagram of an imaging device incorporating at least one imaging device constructed in accordance with an embodiment of the invention.

The exemplary pixel cells of the present invention can be used in a pixel array 114 of the imager device 201 shown in FIG. 12. FIG. 12 illustrates a block diagram for a CMOS imager device 201 having a pixel array 114 with each pixel cell being constructed as described above. Although not shown in FIG. 12, pixel array 114 comprises a plurality of a set 112 of pixel cells arranged in a predetermined number of columns and rows. The pixels of each row in array 114 are all turned on at the same time by respective row select lines (not illustrated), and the set of pixel cells of each column are selectively outputted by respective column select lines (not illustrated). A plurality of row select and column select lines are provided for the entire pixel array 114. The row select lines are selectively activated by the row driver 210 in response to row address decoder 220 and the column select lines are selectively activated by the column driver 260 in response to column address decoder 270. Thus, a row and column address is provided for each pixel.

The CMOS imager device 201 is operated by the control circuit 250 which controls address decoders 220, 270 for selecting the appropriate row select and column select lines for pixel cell readout, and row and column driver circuitry 210, 260 which apply driving voltage to the drive transistors of the selected row select and column select lines. The pixel column signals, which typically include a pixel reset signal Vrst and a pixel image signal Vsig for each pixel are read by sample and hold circuitry ("S/H") 261 associated with the column driver 260. A differential signal Vrst–Vsig is produced for each pixel cell and is amplified by amplifier 262 and digitized by analog-to-digital converter 275 ("ADC"). The digital signals are fed to an image processor 280 that forms a digital image output.

FIG. 13 also illustrates a processor-based system 1100 including an imaging device 201, which has pixel cells constructed in accordance with the present invention. For example, pixel cells may be any of the exemplary pixel cells 107, 105, 103, 100 in accordance with the exemplary embodiments of the invention described above. The processor-based system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other imaging systems.

The processor-based system 1100, for example a camera system, generally comprises a central processing unit (CPU) 1102, such as a microprocessor, that communicates with an input/output (I/O) device 1106 over a bus 1104. Imaging device 201 also communicates with the CPU 1102 over the bus 1104, and may include a CMOS pixel array 114 having any one of the exemplary pixels 107, 105, 103, 100 as discussed above. The processor-based system 1100 also includes random access memory (RAM) 1110, and can include removable memory 1115, such as flash memory, which also communicates with CPU 1102 over the bus 1104. Imaging device 201 may be combined with a processor, such as a CPU, digital signal processor, or microprocessor, with or without memory storage on a single integrated circuit or on a different chip than the processor. Any of the memory storage devices in the processor-based system 1100 could store software for employing the above-described method.

While the invention has been described and illustrated with reference to specific exemplary embodiments, it should be understood that many modifications and substitutions could be made without departing from the spirit and scope of the invention. Accordingly, the invention is not to be considered limited by the foregoing description but is only limited by the scope of the appended claims.

What is claimed as new and desired to be protected by Letters Patent of the United States is:

1. An imaging device comprising:
   at least one pixel array comprising, at least one set of pixels, each set of pixels comprising:
      at least two pixel cells, each pixel cell having a photosensor;
      a mask layer having at least one set of openings, each set of openings corresponding to a set of pixel cells, each opening of a set corresponding to a photosensor of a pixel cell of a set of pixel cells, each set of openings having different sized openings; and
      a neutral density filter layer comprising at least one set of neutral density filters corresponding to a set of mask layer openings such that each filter of a set corresponds to an opening of a mask set, each set of filters having at least two neutral density filters with different light transmit-ability properties,
   wherein a first pixel cell has a mask layer with a first aperture size and a neutral density filter layer with a first transparency and a second pixel cell has a mask with a second aperture size and a neutral density filter layer with a second transparency, wherein said first aperture size is larger than said second aperture size and said first transparency is lighter than said second transparency.

2. An imaging device according to claim 1, wherein said mask layer is made of metal and acts as a light shield.

3. An imaging device according to claim 1, wherein said photo sensor is a photodiode.

4. An imaging device according to claim 1, wherein said set of pixel cells are 4T transistor pixel cells.

5. An imaging device comprising:
   a pixel array with at least two pixel cells, wherein each pixel cell has a photosensor that senses light; and
   a neutral density filter formed over each pixel cell, each pixel cell having a different transparency neutral density filter layer than another pixel cell, and each pixel cell having a mask layer with an aperture opening formed over said photosensor, each aperture opening being a different size from an aperture opening formed over another pixel cell,
   wherein a first pixel cell has a mask layer with a first aperture size and a neutral density filter layer with a first transparency and a second pixel cell has a mask with a second aperture size and a neutral density filter layer with a second transparency, wherein said first aperture size is larger than said second aperture size and said first transparency is lighter than said second transparency.

6. An imaging device according to claim 5, wherein said photosensor is a photodiode.

7. An imaging device according to claim 5, wherein said at least two pixel cells are 4T transistor pixel cells.

8. A method of obtaining a high-dynamic range of operation for an imaging device, said method comprising:
   providing a pixel array having a mask with varying size apertures, said pixel array having a plurality of individual pixel cells each with a photosensor that has varying sensitivities to light;
   providing a first pixel cell with a high sensitivity to light, the first pixel cell subject to a first neutral density filter;
   providing a second pixel cell with a low sensitivity to light, the second pixel subject to a second neutral density filter with different light transmit-ability characteristics than the first neutral density filter; and
   combining the voltage output of said first and second pixel cells to obtain high-dynamic characteristics, wherein said second pixel cell is responsive to bright light conditions and said first pixel cell is responsive to low-light conditions, wherein the varying sized apertures vary in size from small to large in order by adjacent pixels and the first and second neutral density layers vary in transmit-ability from least to most in order.

9. The method of claim 8, wherein said mask is opaque.

10. The method of claim 8, wherein said mask is metal.

11. The method of claim 8, wherein said mask is a neutral density filter layer having varying transparencies formed with varying sized apertures.

12. The method of claim 8, wherein the pixel cells covered with varying sized apertures in order from small to large, are saturated from least to high in that order.

13. An image sensor apparatus comprising:

a pixel array;

said pixel array having a plurality of individual pixel cells each with a photoconversion device that senses different varying light intensities, wherein said photoconversion device for each individual pixel cells are formed to have varying charge capacities;

a neutral density filter array placed over said pixel array; and a mask with varying sized apertures used in conjunction with said neutral density filter array to affect the individual pixel cell's abilities to sense light;

wherein said mask and said neutral density filter array are placed on particular pixel cells based on responsivity requirements to varying light intensities, and said neutral density filter array has more than one light transmitability characteristics wherein a first pixel cell has a mask layer with a first aperture size and a neutral density filter layer with a first transparency and a second pixel cell has a mask with a second aperture size and a neutral density filter layer with a second transparency, wherein said first aperture size is larger than said second aperture size and said first transparency is lighter than said second transparency.

14. An image sensor apparatus according to claim 13, wherein said mask with varying sized apertures is used to control the amount of light that each individual pixel cell's photoconversion device receives.

15. An image sensor apparatus according to claim 13, wherein said mask is positioned under the neutral density filter array.

16. A method for use with high-dynamic range pixel cells, said method comprising:

providing a pixel array having a plurality of individual pixel cells with varying sensitivity to light;

providing at least one pixel cell that has a high saturation to light, the at least one pixel receiving light through a first neutral density filter; and providing at least another pixel cell that has a low saturation to light, the at least another pixel cell receiving light through a second neutral density filter that is darker than the first neutral density filter, wherein a voltage outputted from the at least one pixel cell with high saturation and a voltage outputted from the at least one pixel cell with low saturation is combined.

17. The method of claim 16, further comprising combining the voltage output of said at least one pixel cell and said at least another pixel cell to obtain high-dynamic characteristics.

* * * * *

UNITED STATES PATENT AND TRADEMARK OFFICE
CERTIFICATE OF CORRECTION

PATENT NO. : 7,636,115 B2  Page 1 of 1
APPLICATION NO. : 11/201332
DATED : December 22, 2009
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Ninth Day of November, 2010

David J. Kappos
*Director of the United States Patent and Trademark Office*